United States Patent
Shimizu

(10) Patent No.: US 9,874,627 B2
(45) Date of Patent: Jan. 23, 2018

(54) RADAR APPARATUS

(71) Applicant: DENSO CORPORATION, Kariya, Aichi-pref. (JP)

(72) Inventor: Koji Shimizu, Ichinomiya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 117 days.

(21) Appl. No.: 14/762,172

(22) PCT Filed: Jan. 21, 2014

(86) PCT No.: PCT/JP2014/051106
§ 371 (c)(1),
(2) Date: Jul. 20, 2015

(87) PCT Pub. No.: WO2014/112642
PCT Pub. Date: Jul. 24, 2014

(65) Prior Publication Data
US 2015/0355315 A1 Dec. 10, 2015

(30) Foreign Application Priority Data
Jan. 21, 2013 (JP) .................. 2013-008551

(51) Int. Cl.
*G01S 7/35* (2006.01)
*G01S 7/41* (2006.01)
(Continued)

(52) U.S. Cl.
CPC ............... *G01S 7/412* (2013.01); *G01S 7/35* (2013.01); *G01S 7/352* (2013.01); *G01S 13/34* (2013.01);
(Continued)

(58) Field of Classification Search
CPC ...... G01S 13/32; G01S 13/536; G01S 13/583; G01S 13/584; G01S 13/931; G01S 7/35; G01S 7/354; G01S 3/16
See application file for complete search history.

(56) References Cited

U.S. PATENT DOCUMENTS 6,323,802 B1 * 11/2001 Tokoro ................. G01S 7/292
342/70
6,693,583 B2 * 2/2004 Tamatsu ................ G01S 7/354
180/167
(Continued)

FOREIGN PATENT DOCUMENTS

JP H11-183601 A 7/1999
JP 2000-230974 A 8/2000
(Continued)

OTHER PUBLICATIONS

International Search Report in PCT/JP2014/051106 (english translation), dated Feb. 18, 2014 in 5 pages.
(Continued)

*Primary Examiner* — Peter Bythrow
*Assistant Examiner* — Daniel P Malley, Sr.
(74) *Attorney, Agent, or Firm* — Knobbe, Martens, Olson & Bear, LLP

(57) ABSTRACT

In a radar apparatus, whether or not a second target candidate associated with second target information satisfying a first condition in relation to a first target candidate is present is determined. When determined that the second target candidate is present, the first target information corresponding to the first target candidate is compared with the second target information corresponding to the second target candidate. The "first condition" is that distances and relative speeds match. As a result of the comparison, when a difference between the power at a frequency peak corresponding to the subject target candidate and the power at a (Continued)

frequency peak corresponding to the comparison target candidate is greater than a prescribed threshold, the subject target candidate is determined to be a false image. Meanwhile, when determined that the difference is the prescribed threshold or less, the subject target candidate is determined to be a real image.

17 Claims, 7 Drawing Sheets

(51) Int. Cl.
    *G01S 13/58*     (2006.01)
    *G01S 13/34*     (2006.01)
    *G01S 13/42*     (2006.01)
    *G01S 13/93*     (2006.01)

(52) U.S. Cl.
    CPC ............ *G01S 13/42* (2013.01); *G01S 13/583* (2013.01); *G01S 13/584* (2013.01); *G01S 13/931* (2013.01)

(56) References Cited

U.S. PATENT DOCUMENTS

| | | | | |
|---|---|---|---|---|
| 2006/0022866 A1* | 2/2006 | Walton | ............... | G01S 7/352 342/194 |
| 2006/0262007 A1* | 11/2006 | Bonthron | ............... | G01S 13/34 342/70 |
| 2007/0182619 A1* | 8/2007 | Honda | ............... | H01Q 25/02 342/80 |
| 2009/0224960 A1 | 9/2009 | Ishii et al. | | |
| 2010/0045507 A1* | 2/2010 | Yamano | ............... | G01S 3/74 342/70 |
| 2010/0225523 A1* | 9/2010 | Mizutani | ............... | G01S 3/48 342/83 |
| 2012/0176267 A1* | 7/2012 | Nanami | ............... | G01S 13/426 342/107 |
| 2012/0268314 A1* | 10/2012 | Kuwahara | ............... | G01S 3/74 342/147 |

FOREIGN PATENT DOCUMENTS

| | | |
|---|---|---|
| JP | 2007-333656 A | 12/2007 |
| JP | 2009-210337 A | 9/2009 |
| WO | 2006/009122 A1 | 1/2006 |
| WO | 2008/053685 A1 | 5/2008 |
| WO | 2011/036803 A1 | 3/2011 |
| WO | 2014/112642 A1 | 7/2014 |

OTHER PUBLICATIONS

International Preliminary Report on Patentability; International Application No. PCT/JP2014/051106; Filed: Jan. 21, 2014 (with English translation).

* cited by examiner

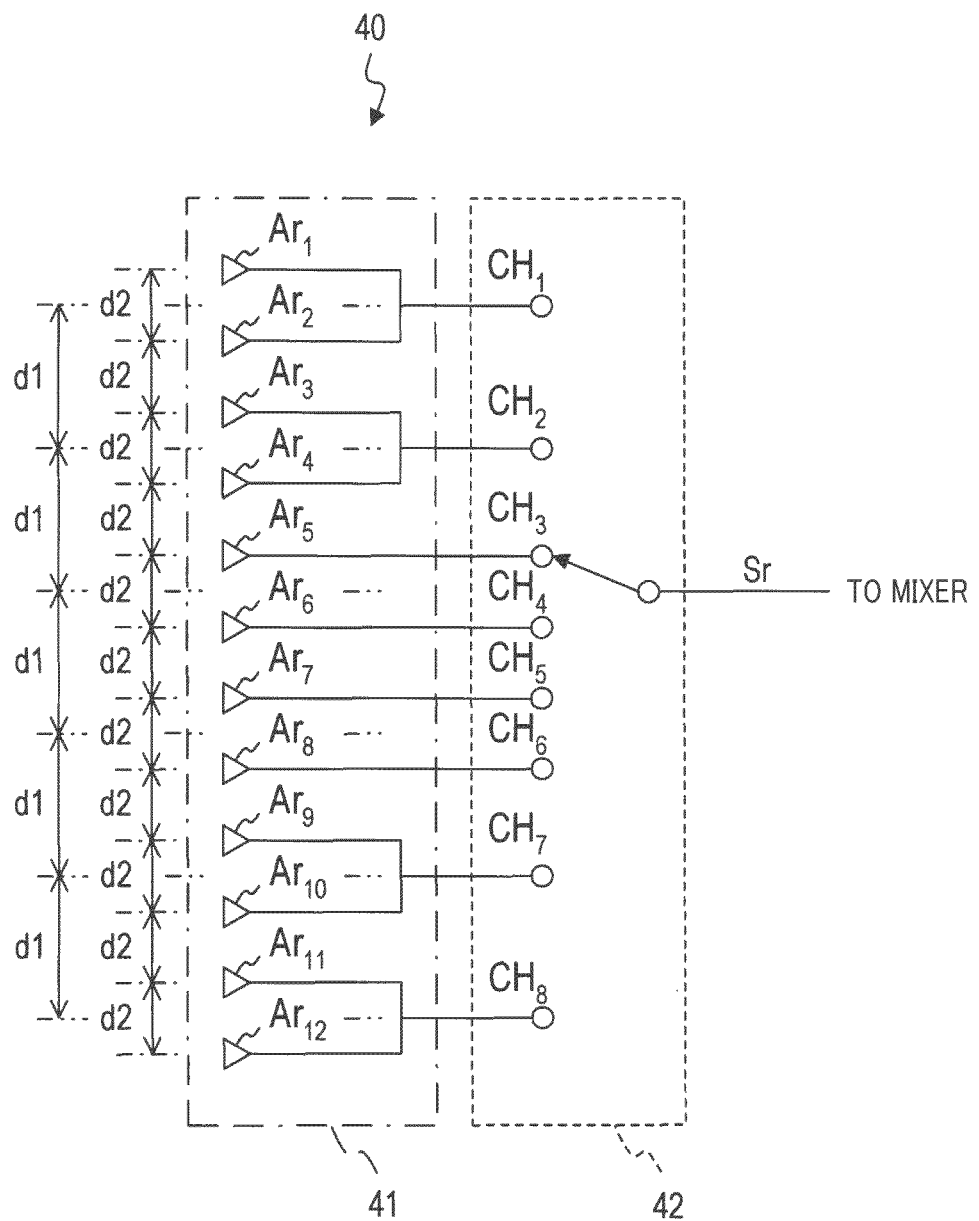

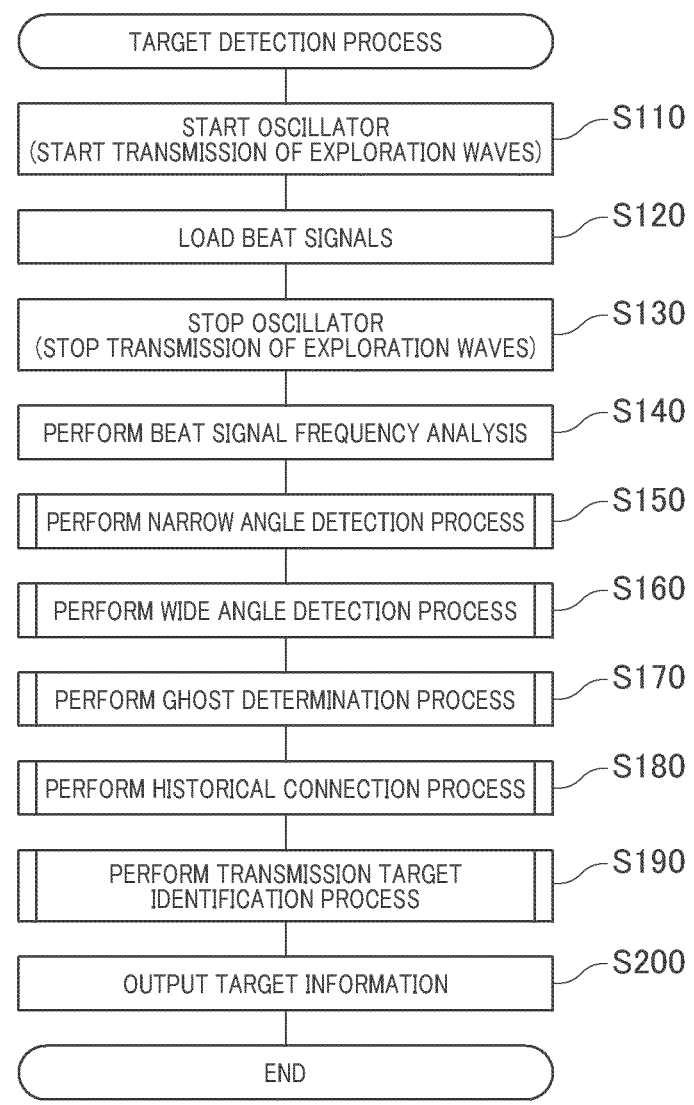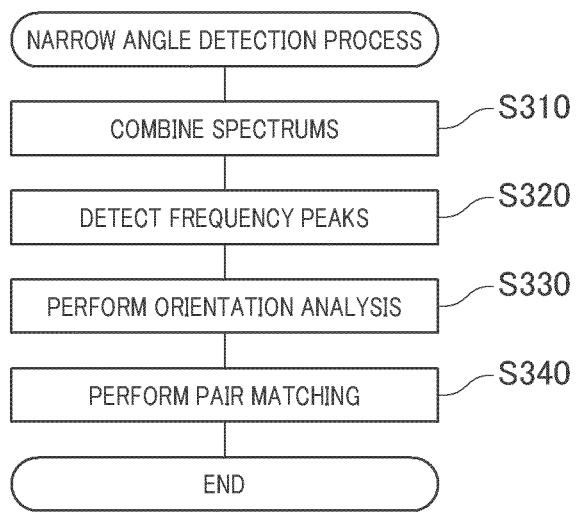

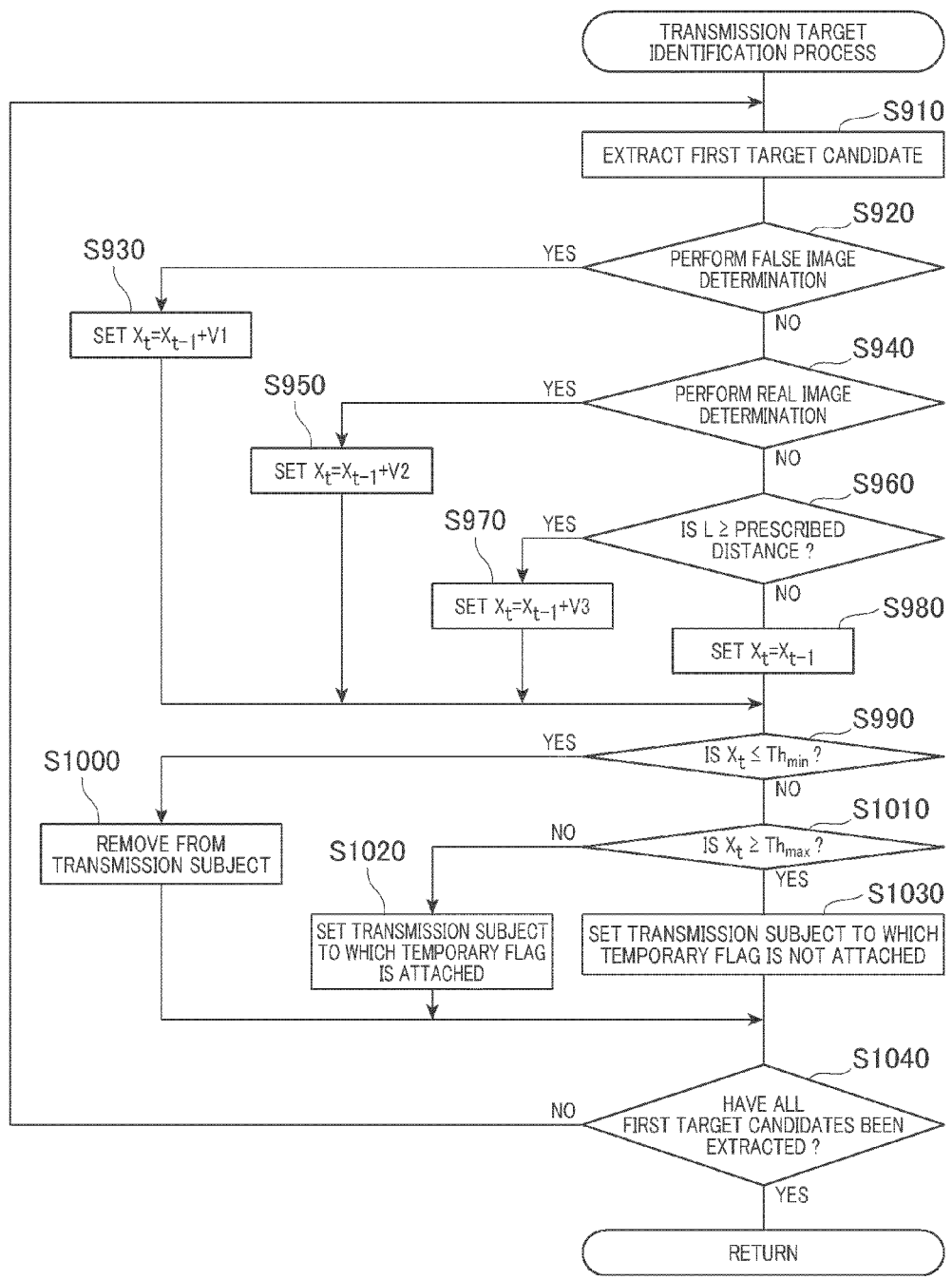

RADAR APPARATUS

CROSS-REFERENCE TO RELATED APPLICATION

This application is based on and claims the benefit of priority from earlier Japanese Patent Application No. 2013-008551 filed on Jan. 21, 2013 the descriptions of which are incorporated herein by reference.

BACKGROUND

Technical Field

The present invention relates to a radar apparatus that detects a target based on the results of transmission and reception of exploration waves.

Background Art

A radar apparatus is conventionally known that includes a transmission antenna that transmits exploration waves, a reception antenna that includes a plurality of antenna elements, and a signal processing unit. In this radar apparatus, the processing unit detects the distance to and orientation (or azimuth direction) of a target that has reflected the exploration waves, based on the results of reception by the reception antenna of the reflected waves of the exploration waves transmitted from the transmission antenna.

This type of radar apparatus includes that in which the arrangement pattern of the antenna elements configuring the reception antenna is composed of two arrangement patterns, one being at a first interval prescribed in advance and the other being at a second interval that is narrower than the first interval (refer to PTL 1).

In the radar apparatus described in PTL 1, when the orientation of the target detected based on the phase difference between reflected waves received by each antenna element disposed at the first interval matches the orientation of the target detected based on the phase difference between reflected waves received by each antenna element disposed at the second interval, the orientation is recognized as being an appropriate orientation.

In other words, in the radar apparatus described in PTL 1, a plurality of arrangement patterns that differ from each other are used as the arrangement pattern of the antenna elements. When the orientation of the target detected based on reception signals received by the antenna elements disposed in each arrangement pattern matches, the target is considered to be a real image.

Citation List

[Patent Literature]
[PTL 1] JP-A-2000-230974
[Technical Problem]

However, in the method of determining whether or not a target is a real image described in PTL 1, only the phase difference between the reflected waves is used as an indicator, and therefore, a problem is present in that the accuracy of determination regarding whether or not the target is a real image is low.

SUMMARY

Therefore, it is desired to improve the accuracy of determination regarding whether a target is a real image or a false image in a radar apparatus.

The present is provided to achieve the above-described object relates to a radar apparatus.

The radar apparatus of the present disclosure includes a transmitting means, a first receiving means, a first calculating means, a second receiving means, a second calculating means, a comparing means, and a determining means.

The transmitting means transmits exploration waves. The first receiving means acquires first reception signals that correspond to signal waveforms received by each antenna element disposed at a first interval prescribed in advance.

The first calculating means detects a first target candidate that is a candidate for each target that has reflected the exploration waves transmitted from the transmitting means, based on the results of reception of the first reception signals. The first calculating means also calculates, for each first target candidate, first target information including at least a signal level of the first reception signal corresponding to the first target candidate, a first distance to the first target candidate, and a first orientation that is the orientation in which the first target candidate is present and is detected by an electronic scanning method.

In addition, the second receiving means acquires second reception signals that correspond to signal waveforms received by each antenna element disposed at a second interval that is narrower than the first interval. The second calculating means detects a second target candidate that is a candidate for each target that has reflected the exploration waves transmitted from the transmitting means, based on the results of reception of the second reception signals. The second calculating means also calculates, for each second target candidate, second target information including at least a signal level of the second reception signal corresponding to the second target candidate, a second distance to the second target candidate, and a second orientation that is the orientation in which the second target candidate is present and is detected by an electronic scanning method.

Furthermore, among the first target candidates detected by the first calculating means, each first target candidate that has a first distance that matches a second distance included in the second target information calculated by the second calculating means is determined to be as a subject target candidate. The comparing means compares the first target information of each subject target candidate with the second target information including the second distance that matches the first distance of each subject target candidate.

The determining means determines whether the subject target candidate is a real image or a false image based on the results of the comparison.

In a radar apparatus such as this, whether each subject target candidate is a real image or a false image can be determined by the first target information of each subject target candidate being compared with the second target information. The first target information and the second target information used in the determination include the signal levels of the signals received by the reception antenna, in addition to the first and second orientations based on the signal waveforms received by the reception antenna (that is, the orientation detected based on the phase difference between the first reception signals and the orientation detected based on the phase difference between the second reception signals), respectively.

Therefore, in the radar apparatus, the accuracy of determination regarding whether a target candidate is a real image or a false image can be improved.

"The first distance and the second distance match" herein includes not only a complete match, but also the first distance and the second distance falling within a range that can be considered a match. Specifically, "the first distance and the second distance match" includes the difference between the first distance and the second distance being "0", and the difference between the first distance and the second distance being within an allowable range.

When the arrangement interval of the antenna elements differs, the directivity differs depending on the arrangement interval of the antenna elements.

When the orientation of each target candidate is detected by an electronic scanning method based on the reception signals received by reception antennas having differing directivity, the difference between the signal level of the first reception signal and the signal level of the second reception signal becomes small when the target candidate is a real image.

Therefore, the determining means of the radar apparatus may determine that the subject target candidate is a real image when the difference between the signal level of the first reception signal and the signal level of the second reception signal is within a prescribed range prescribed in advance.

In a radar apparatus such as this, the accuracy of determination regarding the determination that a subject target candidate is a real image can be improved.

Meanwhile, when the orientation of each target candidate is detected by an electronic scanning method based on the reception signals received by reception antennas having differing directivity, the difference between the signal level of the first reception signal and the signal level of the second reception signal becomes large when the target candidate is a false image.

Moreover, when the target candidate is a false image, the first orientation is highly likely to be a position at which the second orientation is folded. In this case, the range of the incoming wave that is folded to the range of an orientation detectable by the electronic scanning method regarding the first reception signal is determined by the arrangement interval of the antenna elements, or in other words, the first interval, and is a range that is prescribed advance.

Therefore, should the angle range (in other words, a prescribed angle range) of the difference between the first orientation and the second orientation when the subject target candidate is a false image be determined in advance through experiments and the like, the detecting means of the radar apparatus may determine that the subject target candidate is a false image when the difference between the first orientation and the second orientation is within the prescribed angle range.

In a radar apparatus such as this, a determination can be made that a subject target candidate is a false image.

The "prescribed angle range" herein is an angle range that has been determined in advance as an indicator for determining an aliasing phenomenon that occurs as a result of phase difference "$\Delta\varphi$" and phase difference "$\Delta\varphi+2\pi$" becoming indistinguishable.

BRIEF DESCRIPTION OF DRAWINGS

In the accompanying drawings:
FIG. 2 is an explanatory diagram of a reception antenna unit of the radar apparatus;
FIG. 3 is a flowchart of the processing procedure for a target detection process;
FIG. 4 is a flowchart of the processing procedure for a narrow angle detection process;
FIG. 8 is a flowchart of the processing procedure for a transmission target identification process.

DESCRIPTION OF EMBODIMENTS

Figure 1:
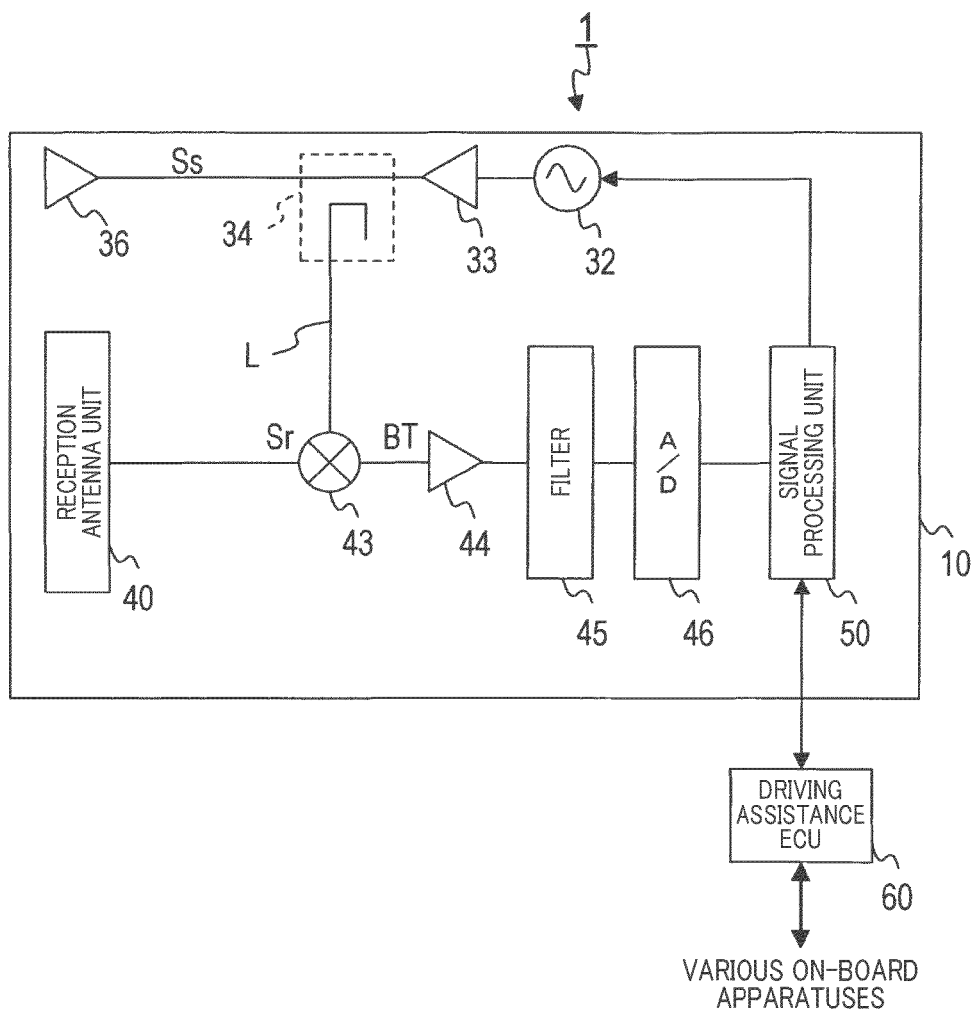
FIG. 1 is a block diagram of an overall configuration of a radar apparatus according to an embodiment to which the present invention is applied.

An embodiment of the present invention will hereinafter be described with reference to the drawings.
<Overall Configuration>
A driving assistance system 1 shown in FIG. 1 is a system that actualizes adaptive cruise control (ACC) for maintaining inter-vehicle distance between a leading vehicle and an own vehicle at an appropriate distance, and a pre-crash safety system (PCS) for reinforcing the braking force of the vehicle and the restraining force of the seatbelts when a collision with an obstacle present on an advancing path of the own vehicle is unavoidable.

The driving assistance system 1 includes a radar sensor 10 and a driving assistance electronic control unit (referred to, hereinafter, as a "driving assistance ECU") 60.

The radar sensor 10 is configured as a so-called millimeter wave radar apparatus that is a frequency-modulated continuous wave (FMCW) type, and recognizes a target, such as a leading vehicle or a road-side object, based on the results of transmission and reception of millimeter waveband continuous waves (referred to, hereinafter, as "exploration waves") that are frequency modulated along a time axis. In addition, the radar sensor 10 also generates target information related to the recognized target, and transmits the target information to the driving assistance ECU 60. The target information includes at least the relative speed to the target and the position (distance and orientation) of the target.

The driving assistance ECU 60 is mainly configured by a known microcomputer that includes at least a read-only memory (ROM), a random access memory (RAM), and a central processing unit (CPU), and includes at least a bus controller for performing communication via a local area network (LAN) communication bus.

At least a brake control unit, an engine control unit, and a seatbelt control unit (not shown) are connected to the driving assistance ECU 60 via the LAN communication bus.

The brake control unit sends, to the driving assistance ECU 60, a braking state determined based on detection information from an M/C pressure sensor, as well as status information (steering angle and yaw rate) obtained from a steering sensor and a yaw rate sensor (not shown). Furthermore, the brake control unit controls the braking force applied to the own vehicle based on a target acceleration rate, a brake request, and the like from the driving assistance ECU 60, and the braking state.

The engine control unit sends, to the driving assistance ECU 60, status information (that is, vehicle speed, engine control state, and accelerator operating state) obtained from a vehicle speed sensor, a throttle opening sensor, and an accelerator pedal opening sensor (not shown). Furthermore, the engine control unit controls the driving force of an internal combustion engine and a driving system depending on a driving state that is based on a target acceleration rate, a fuel-cut request, and the like from the driving assistance ECU 60.

The seatbelt control unit controls the restraining force of the seatbelts by driving a motor (not shown), when an emergency signal indicating that a collision between the own vehicle and a target is unavoidable is received from the driving assistance ECU 60.

A warning buzzer, a monitor, a cruise control switch, a target inter-vehicle setting switch and the like (not shown) are connected to the driving assistance ECU 60. Furthermore, the driving assistance ECU 60 receives target information from the radar sensor 10, vehicle speed and engine control state from the engine control unit, steering angle, yaw rate, and brake control state from the brake control unit, and the like.

In other words, the driving assistance ECU 60 actualizes adaptive cruise control by outputting the target acceleration rate, a fuel-cut request, and the like to the engine control unit and outputting the target acceleration rate, a brake request, and the like to the brake control unit, as control values for appropriately maintaining the inter-vehicle distance to the leading vehicle, based on the setting values of the cruise control switch, the target inter-vehicle setting switch, and the like, and the target information received from the radar sensor 10.

In addition, the driving assistance ECU 60 actualizes the pre-crash safety system by determining the likelihood of a collision based on the target information received from the radar sensor 10, and when the likelihood of a collision becomes equal to or higher than a prescribed value prescribed in advance, outputting a brake request to the brake control unit to increase the braking force of the own vehicle and outputting an emergency signal to the seatbelt control unit.

<Radar Sensor>

The radar sensor 10 includes an oscillator 32, an amplifier 33, a distributor 34, a transmission antenna 36, and a reception antenna unit 40.

The oscillator 32 generates millimeter waveband high-frequency signals that are modulated to have a rising period during which the frequency linearly increases in relation to time, and a falling period during which the frequency linearly decreases. The amplifier 33 amplifies the high-frequency signals generated by the oscillator 32. The distributor 34 performs power distribution of the output from the amplifier 33 to transmission signals Ss and local signals L. The transmission antenna 36 emits exploration waves based on the transmission signals Ss.

As shown in FIG. 2, the reception antenna unit 40 includes an array antenna 41 and a reception switch 42.

The array antenna 41 is that in which an n number of antenna elements $Ar_i$ are disposed at even intervals, at a second interval d2 prescribed in advance. The array antenna 41 includes a plurality of subarray antennas. The number of subarray antennas according to the present embodiment is four.

The subarray antenna combines the exploration waves received by a preset number m (m being an integer of 2 or more; m=2 according to the present embodiment) of antenna elements Ar that are adjacent to each other, with the exploration waves remaining in the form of analog signals. According to the present embodiment, the subarray antenna is configured by antenna elements $Ar_1$ to $Ar_m$ and $A_{1-(m-1)}$ to $Ar_i$ ($Ar_1$ to $Ar_2$, and $Ar_{11}$ to $Ar_{12}$, according to the present embodiment) that are disposed on both end portions of the array antenna 41. Furthermore, according to the present embodiment, the subarray antenna is also configured by antenna elements $Ar_3$ to $Ar_4$, and $Ar_{11}$ to $Ar_{12}$.

In other words, the subarray antenna operates as a single antenna and outputs reception signals Sr to the reception switch 42. According to the present embodiment, a single subarray antenna is treated as a single antenna element.

Meanwhile, antenna elements Ar that are not configured as the subarray antennas operate such that the antenna element Ar itself is a single antenna. In other words, each antenna element Ar is configured to output the exploration waves itself, received by the antenna element Ar, to the reception switch 42 as the reception signals Sr.

In other words, in the array antenna 41, the antenna elements that are not configured as the subarray antennas function as a second receiving means in the scope of claims. In addition, as a result of all of the n number of antenna elements $Ar_i$ disposed at the second interval operating as subarray antennas, each composed of two adjacent antenna elements $Ar_i$, the array antenna 41 functions as a reception antenna in which the antenna elements are disposed at a first interval d1 that is wider than the second interval d2.

The reception switch 42 successively selects any of the antenna elements $Ar_i$ configuring the array antenna 41 and supplies the reception signals Sr from the selected antenna element $Ar_i$ to a mixer 43.

Therefore, the number of reception channels $CH_j$ that can be selected by the reception switch 42 is the number of elements i of the antenna elements $Ar_i$ subtracted by 2 m (in other words, j=1 to i−2). According to the present embodiment, a reception channel $CH_1$ is assigned to the subarray antenna composed of the antenna elements $Ar_1$ and $Ar_2$. A reception channel $CH_2$ is assigned to the subarray antenna composed of the antenna elements $Ar_3$ and $Ar_4$. In addition, according to the present embodiment, a reception channel $CH_7$ is assigned to the subarray antenna composed of the antenna elements $Ar_9$ and $Ar_{10}$, and a reception channel $CH_8$ is assigned to the subarray antenna composed of the antenna elements $Ar_{11}$ and $Ar_{12}$. Furthermore, according to the present embodiment, reception channels $CH_3$ to $CH_6$ are respectively assigned to the antenna elements $Ar_5$ to $Ar_7$.

The radar sensor 10 further includes the mixer 43, an amplifier 44, a filter 45, an analog/digital (A/D) converter 46, and a signal processing unit 50.

The mixer 43 combines the reception signals Sr from the reception antenna unit 40 and the local signals L, and generates beat signal BT. The amplifier 44 amplifies the beat signals BT generated by the mixer 43. The filter 45 removes unnecessary signal components from the beat signals amplified by the amplifier 44. The A/D converter 46 samples the output from the filter 45 and converts the sampled output to digital data.

The signal processing unit 50 is mainly configured by a known microcomputer that includes at least a ROM, a RAM, and a CPU, and also includes a calculation processing unit (such as digital signal processing (DSP)) for performing fast Fourier transform (FFT) and the like on the data loaded via the A/D converter 46.

The signal processing unit 50 controls the start and stop of the oscillator 32, and the sampling of the beat signals BT via the A/D converter 46, performs signal processing using the sampling data, communicates with the driving assistance ECU 60, and performs a target detection process in which information (such as vehicle speed) necessary for signal processing and target information obtained as a result of the signal processing are transmitted and received.

<Overview of Operations of the Radar Sensor>

In the radar sensor 10 configured as described above, when the oscillator 32 oscillates based on a command from the signal processing unit 50, the distributor 34 performs power distribution of the high-frequency signals generated by the oscillator 32 and amplified by the amplifier 33, thereby generating the transmission signals Ss and the local signals L. Of the generated signals, the transmission signals Ss are transmitted via the transmission antenna 36 as the exploration waves.

The exploration waves that have been sent from the transmission antenna 36 and reflected by a target (in other words, reflected waves) are then received by all antenna elements $Ar_i$ configuring the reception antenna unit 40, and only the reception signals Sr from the reception channel $CH_j$ (j=1 to i−2(m−1)) selected by the reception switch 42 are supplied to the mixer 43. Then, the mixer 43 combines the reception signals Sr with the local signals L from the distributor 34, thereby generating the beat signals BT. After the beat signals BT are amplified by the amplifier 44, the filter 45 removes unnecessary signal components. Furthermore, the A/D converter 46 samples the beat signals from which unnecessary signal components have been removed, and loads the sampled beat signals to the signal processing unit 50.

The reception switch 42 performs switching so as to select all of the reception channels $CH_1$ to $CH_j$ a predetermined number of times (such as 1024 times) each during a single modulation cycle of the exploration waves. In addition, the AD converter 46 performs sampling synchronously with the switching timing. In other words, during a single modulation cycle of the exploration waves, sampling data amounting to a predetermined number of sampling operations (such as 512 times) is collected for each of the reception channels $CH_1$ to $CH_j$, during each rising and falling period.

<Target Detection Process>

The target detection process performed by the signal processing unit 50 is started at a prescribed time interval prescribed in advance (in other words, a measurement cycle).

When the target detection process is started, as shown in FIG. 3, first, the signal processing unit 50 starts the oscillator 32 and starts to transmit the exploration waves (Step S110). Next, the signal processing unit 50 acquires sampling values of the beat signals BT via the A/D converter 46 (Step S120), and then stops transmission of the exploration waves by stopping the oscillator 32 when the required amount of sampling values is acquired (Step S130).

Next, the signal processing unit 50 performs frequency analysis (FFT processing, according to the present embodiment) of the sampling values acquired at Step S130, and determines a power spectrum of the beat signals BT for each of the reception channels $CH_1$ to $CH_N$ and for each rising and falling period (Step S140). Here, N is a given positive integer and indicates the number of reception channels. The power spectrum indicates the frequencies included in the beat signals BT and the strength at each frequency.

Next, the signal processing unit 50 generates a specified spectrum, and performs a narrow angle detection process to detect first target candidates based on the specified spectrum and generate first target information that is target information related to each first target candidate (Step S150).

The specified spectrum herein refers to a power spectrum in which frequency analysis is performed on first reception signals corresponding to signal waveforms received by the antenna elements Ar disposed at the first interval d1 (=2× d2). In addition, the first target information generated at Step S150 includes a first distance L to the first target candidate, a first relative speed between the first target candidate and the own vehicle, the orientation (referred to, hereinafter, as a "first orientation") $\theta_L$ in which the first target candidate is present, and power (in other words, signal level) at the frequency peak corresponding to the first target candidate.

Furthermore, in the target detection process, the signal processing unit 50 performs a wide angle detection process in which second target candidates are detected based on a wide angle spectrum that is the result of frequency analysis performed on the reception signals Sr from a plurality of prescribed reception channels prescribed in advance, and second target information that is target information related to each second target candidate is generated (Step S160).

As the prescribed channels according to the present embodiment, each of the reception channels $CH_3$ to $CH_6$ are prescribed. In other words, the wide angle spectrum is a power spectrum indicating the results of FFT performed on second reception signals corresponding to signal waveforms received by the antenna elements $Ar_5$ to $Ar_8$ disposed at the second interval d2 that is narrower than the first interval d1. In addition, the second target information includes a second distance to the second target candidate, a second relative speed between the second target candidate and the own vehicle, the orientation (referred to, hereinafter, as a "second orientation") $\theta_W$ in which the second target candidate is present, and power (in other words, signal level) at the frequency peak corresponding to the second target candidate.

Next, in the target detection process, the signal processing unit 50 performs a ghost determination process to determine whether the first target candidate is a real image or a false image, based on the result of comparison between the first target information and the second target information (Step S170).

Furthermore, the signal processing unit 50 performs a historical connection process to estimate the probability of the first target candidate as a target, based on the first target information (that is, the distance, speed, first orientation $\theta_L$, and the like) of the first target candidates detected during the current measurement cycle (referred to, hereinafter, as "current cycle candidates") (Step S180). Next, the signal processing unit 50 performs a transmission target identification process to identify the target information to be outputted outside (Step S190), and outputs the target information of the target identified in the transmission target identification process (Step S200).

Thereafter, the signal processing unit 50 ends the target detection process.

<Narrow Angle Detection Process>

As shown in FIG. 4, in the narrow angle detection process started at Step S150 of the target detection process, the signal processing unit 50 determines the specified spectrum by combining the power spectrum of each reception channel $CH_1$ to $CH_j$ determined at the earlier Step S140 with each reception channel determined in advance (referred to, hereinafter as, a specified channel). According to the present embodiment, the signal processing unit 50 performs vector synthesis of the FFT results (real parts and imaginary parts, respectively) of the beat signals BT determined for each specified channel, and calculates the specified spectrum.

The specified channels according to the present embodiment are determined to be two reception channels that are adjacent to each other, excluding the reception channels $CH_1$, $CH_2$, $CH_7$, and $CH_8$ corresponding to the subarray antennas, or in other words, the reception channels $CH_3$ and $CH_4$ and the reception channels $CH_5$ and $CH_6$. In addition, according to the present embodiment, the power spectrums of the beat signals BT respectively calculated from the reception channels $CH_1$, $CH_2$, $CH_7$, and $CH_8$ are also specified spectrums.

Next, the signal processing unit 50 calculates peak frequency components (referred to, hereinafter, as frequency peaks) present in the specified spectrums determined at Step S130 (Step S320).

Specifically, the signal processing unit 50 calculates an average spectrum by obtaining the arithmetic average of all specified spectrums determined at Step S310, and detects peak points (in other words, local maximum points) at which the frequency exceeds a preset threshold set in advance as frequency peaks. In other words, the frequency peaks detected at Step S320 each indicate the distance to a target candidate that is likely to be a target that has reflected the radar waves, and the signal processing unit 50 detects each target candidate at Step S320.

Then, the signal processing unit 50 performs orientation analysis to estimate the orientation in which the target candidate detected at Step S320 is present, based on the specified spectrum (Step S330). However, according to the present embodiment, as a method of orientation analysis, a known multiple signal classification (MUSIC) method is used that determines a MUSIC spectrum from the specified spectrum using null points of an array antenna having a narrow half-value angle.

Furthermore, the signal processing unit 50 determines whether or not power difference and angle difference between the frequency peak determined from the beat signals BT during the rising period and the frequency peak determined from the beat signals BT during the falling period are within allowable ranges prescribed in advance. As a result of the determination, when determined that both peaks are within the allowable ranges, the signal processing unit 50 performs pair matching to recognize the two peaks as a first target candidate (Step S340). The first target candidate is a target candidate that is probable as the target.

In pair matching, the signal processing unit 50 generates the first target information including the distance to the first target candidate, the relative speed between the first target candidate and the own vehicle, the first orientation $\theta_L$ in which the first target candidate is present, and the power (that is, the signal level) of the frequency peak corresponding to the first target candidate for only the recognized first target candidate, and then returns to the target detection process.

In other words, in the narrow angle detection process, the signal processing unit 50 extracts a combination of frequency peaks based on the reflected waves from a target present within a narrow angle area under conditions prescribed in advance, recognizes the combination of frequency peaks as a first target candidate, and generates the first target information for each first target candidate.

The narrow angle area refers to an angle range determined by the arrangement interval of the antenna elements being the first interval d1. The area in the vehicle width direction of the narrow angle area is, for example, an angle range of ±α° from a reference line that is perpendicular to a reference axis of the antenna, and the distance in the vehicle advancing direction of the narrow angle area is, for example, about 200 m.

<Wide Angle Detection Process>

Figure 5:
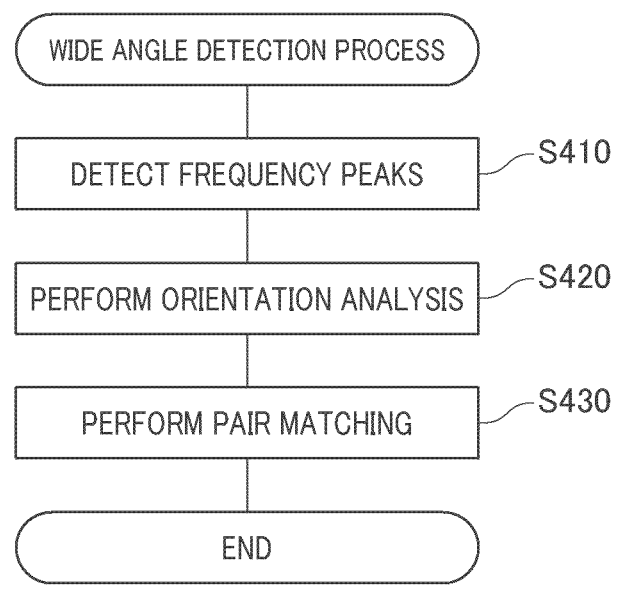
FIG. 5 is a flowchart of the processing procedure for a wide angle detection process.

As shown in FIG. 5, in the wide angle detection process performed at Step S160 of the target detection process, the signal processing unit 50 extracts a wide angle spectrum from all power spectrums determined at the earlier Step S140, and detects the frequency peaks present in the extracted wide angle spectrum (Step S410). The method of detecting the frequency peaks at Step S410 is similar to the method for detecting the frequency peaks at Step S320. Therefore, a detailed description thereof is omitted herein.

Next, based on the wide angle spectrum extracted at Step S410, the signal processing unit 50 performs orientation analysis to estimate the orientation in which the target candidate is present (Step S420). At Step S420 according to the present embodiment, the known MUSIC method may be used as the method of orientation analysis.

Furthermore, at Step S410, the signal processing unit 50 determines whether or not power difference and angle difference between the frequency peak determined from the beat signals BT during the rising period and the frequency peak determined from the beat signals BT during the falling period are within allowable ranges prescribed in advance. As a result of the determination, when determined that both peaks are within the allowable ranges, the signal processing unit 50 performs pair matching to recognize the two peaks as a second target candidate (Step S430). The second target candidate is a target candidate that is probable as the target.

In pair matching at Step S430, the signal processing unit 50 generates the second target information including the distance to the second target candidate, the relative speed between the second target candidate and the own vehicle, the second orientation $\theta_W$ in which the second target candidate is present, and the power (that is, the signal level) of the frequency peak corresponding to the second target candidate for only the recognized second target candidate, and then returns to the target detection process.

In other words, in the wide angle detection process, the signal processing unit 50 extracts a combination of frequency peaks based on the reflected waves from the same target present within a wide angle area under conditions prescribed in advance, recognizes the combination of frequency peaks as a second target candidate, and generates the second target information for each second target candidate.

The wide angle area herein refers to an angle range determined by the arrangement interval of the antenna elements being the second interval d2. The area in the vehicle width direction of the wide angle area is, for example, an angle range of ±β° (where β>α) from the reference line that is perpendicular to the reference axis of the antenna. Because the first interval d1 is narrower than the second interval d2, the wide angle area is wider than the narrow angle area. The distance of the wide angle area in the vehicle advancing direction of the narrow angle area is shorter than that of the narrow angle area because the first interval d1 is narrower than the second interval d2.

<Ghost Determination Process>

Figure 6:
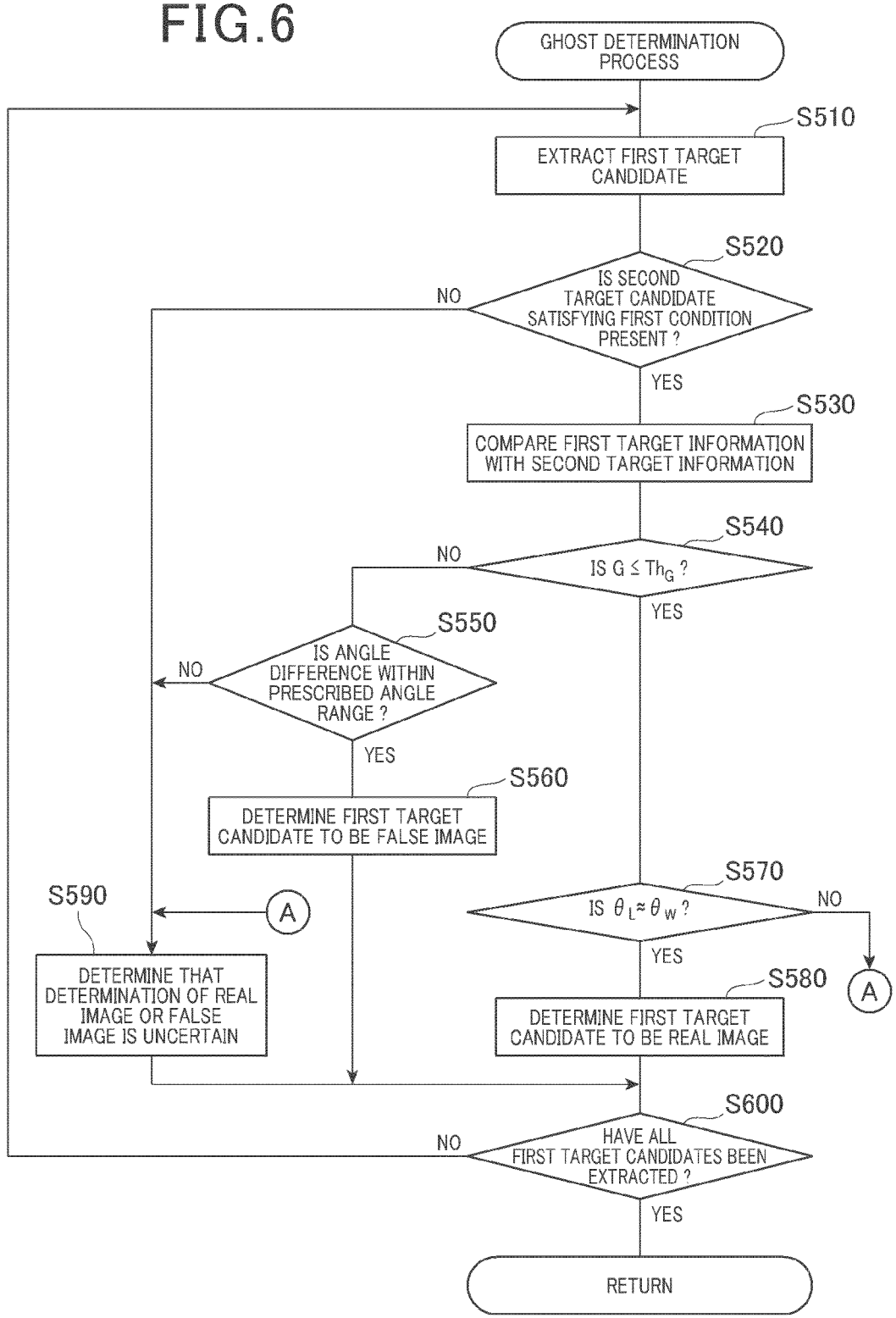
FIG. 6 is a flowchart of the processing procedure for a ghost determination process.

As shown in FIG. 6, in the ghost determination process performed at Step S170 of the target detection process, the signal processing unit 50 extracts one of the first target candidates detected in the narrow angle detection process performed at the earlier Step S150 (Step S510).

Next, the signal processing unit 50 determines whether or not a second target candidate is present that is associated with second target information that satisfies a first condition prescribed in advance in relation to the first target candidate, based on the first target information corresponding to the first target candidate extracted at Step S510 (Step S520). The "first condition" herein is that the distances of the first target candidate and the second target candidate are within a range in which the distances can be considered to be a match, and the relative speed between the first target candidate and the own vehicle and the relative speed between the second target candidate and the own vehicle are within a range in which the relative speeds can be considered to be a match.

As a result of the determination at Step S520, when determined that a second target candidate that satisfies the first condition in relation to the first target candidate extracted at Step S510 is not present (NO at Step S520), the signal processing unit 50 proceeds to Step S590, described in detail hereafter.

Meanwhile, as a result of the determination at Step S520, when determined that a second target candidate that satisfies the first condition in relation to the first target candidate extracted at Step S510 is present (YES at Step S520), the signal processing unit 50 compares the first target information corresponding to the first target candidate extracted at Step S510 with the second target information corresponding to the second target candidate determined to satisfy the first condition at Step S520 (Step S530). Hereafter, the second target candidate determined to satisfy the first condition is referred to as a "comparison target candidate" and the first target candidate for which the comparison target candidate is present is referred to as a "subject target candidate".

As a result of the comparison at Step S530, the signal processing unit 50 determines whether or not a difference G between the power (that is, the signal level) at the frequency peak corresponding to the subject target candidate and the power (that is, the signal level) at the frequency peak corresponding to the comparison target candidate is equal to or lower than a prescribed threshold $Th_G$ prescribed in advance (Step S540).

The prescribed threshold $Th_G$ is prescribed in advance based on the characteristics of the antenna elements Ar configuring the reception antenna unit 40. Specifically, the prescribed threshold $Th_G$ is prescribed to be the difference between power $G_W(\theta)$ when reflected waves are received from a real image based on the directivity of the antenna elements $Ar_5$ to $Ar_8$ disposed at the second interval d2, and power $G_L(\theta)$ when reflected waves are received from a real image based on the directivity of the antenna elements disposed at the first interval d1. For example, the prescribed threshold $Th_G$ is "−3 dB".

As a result of the determination at Step S540, when determined that the difference G is the prescribed threshold $Th_G$ or lower (YES at Step S540), the signal processing unit 50 proceeds to Step S570, described in detail hereafter.

Meanwhile, as a result of the determination at Step S540, when determined that the difference G is higher than the prescribed threshold $Th_G$ (NO at Step S540), the signal processing unit 50 determines whether or not a difference $\Delta\theta$ between the first orientation $\theta_L$ corresponding to the subject target candidate and the second orientation $\theta_W$ corresponding to the comparison target candidate is within a prescribed angle range $Th\theta$ prescribed in advance (Step S550).

The "prescribed angle range $Th\theta$" herein refers to an angle range determined as an indicator for determining an aliasing phenomenon that occurs as a result of phase difference "$\Delta\varphi$" being indistinguishable from phase difference "$\Delta\varphi+2\pi$" in the reception signals received by the plurality of antenna elements Ar configuring the reception antenna unit 40. In other words, when the orientation of incoming waves is detected by an electronic scanning method, the angle range over which the orientation of the incoming waves is folded to a range enabling detection is a range prescribed in advance that is determined by the arrangement interval of the antenna elements Ar, or in other words, the first interval d1.

Specifically, the prescribed angle range $Th\theta$ according to the present embodiment is prescribed as being the difference between the second orientation $\theta_W$ folded to the first orientation $\theta_L$ and the first orientation $\theta_L$ when the first target candidate is a false image. For example, the prescribed angle range $Th\theta$ is 37 degrees or more and less than 47 degrees.

As a result of the determination at Step S550, when determined that the difference $\Delta\theta$ is within the prescribed angle range $Th\theta$ (YES at Step S550), the signal processing unit 50 determines that the subject target candidate is a false image and attaches a flag indicating false image to the first target information corresponding to the target candidate (Step S560). The signal processing unit 50 then proceeds to Step S600, described in detail hereafter.

Meanwhile, as a result of the determination at Step S550, when determined that the difference $\Delta\theta$ is outside the prescribed angle range $Th\theta$ (NO at Step S550), the signal processing unit 50 proceeds to Step S590.

At Step S570 to which the signal processing unit 50 proceeds when determined that the difference G is the prescribed threshold $Th_G$ or lower (YES at Step S540) as a result of the determination at Step S540, the signal processing unit 50 determines whether or not the first orientation $\theta_L$ corresponding to the subject target candidate matches the second orientation $\theta_W$ corresponding to the comparison target candidate. As a result of the determination at Step S570, when determined that the first orientation $\theta_L$ corresponding to the subject target candidate matches the second orientation $\theta_W$ corresponding to the comparison target candidate (YES at Step S570), the signal processing unit 50 determines that the subject target candidate is a real image and attaches a flag indicating real image to the first target information corresponding to the target candidate (Step S580). Here, "the first orientation $\theta_L$ matches the second orientation $\theta_W$" includes the difference between the first orientation $\theta_L$ and the second orientation $\theta_W$ being within an allowable range prescribed in advance as a range over which the difference can be considered to be "0", in addition to the difference between the first orientation $\theta_L$ and the second orientation $\theta_W$ being "0".

The signal processing unit 50 then proceeds to Step S600.

Meanwhile, as a result of the determination at Step S570, when determined that the first orientation $\theta_L$ corresponding to the subject target candidate does not match the second orientation $\theta_W$ corresponding to the comparison target candidate (NO at Step S570), the signal processing unit 50 proceeds to Step S590. The signal processing unit 50 also proceeds to Step S590 when determined that a second target candidate that satisfies the first condition in relation to the first target candidate extracted at Step S510 is not preset (NO at Step S520) and when determined that the difference $\Delta\theta$ is outside the prescribed angle range $Th\theta$ (NO at Step S550).

At Step S590, the signal processing unit 50 determines that the first target candidate extracted at Step S510 is that for which determination of real image or false image is unclear, and attaches a flag indicating that determination of real image or false image is unclear to the first target information corresponding to the first target candidate. In other words, when determined that whether the first target candidate extracted at Step S510 is a real image or a false image is uncertain, the signal processing unit 50 suspends the determination result regarding the first target candidate (subject target candidate) as being uncertain.

At subsequent Step S600, the signal processing unit 50 determines whether or not the processes from Step S510 to Step S590 have been performed for all first target candidates. As a result of the determination at Step S600, when determined that the processes from Step S510 to Step S590 have not been performed for all first target candidates (NO at Step S600), the signal processing unit 50 returns to Step S510, extracts a new first target candidate, and proceeds to Step S520.

Meanwhile, as a result of the determination at Step S600, when determined that the processes from Step S510 to Step S590 have been performed for all first target candidates (YES at Step S600), the signal processing unit 50 ends the ghost determination process and proceeds to Step S180 of the target detection process.

<Historical Connection Process>

Figure 7:
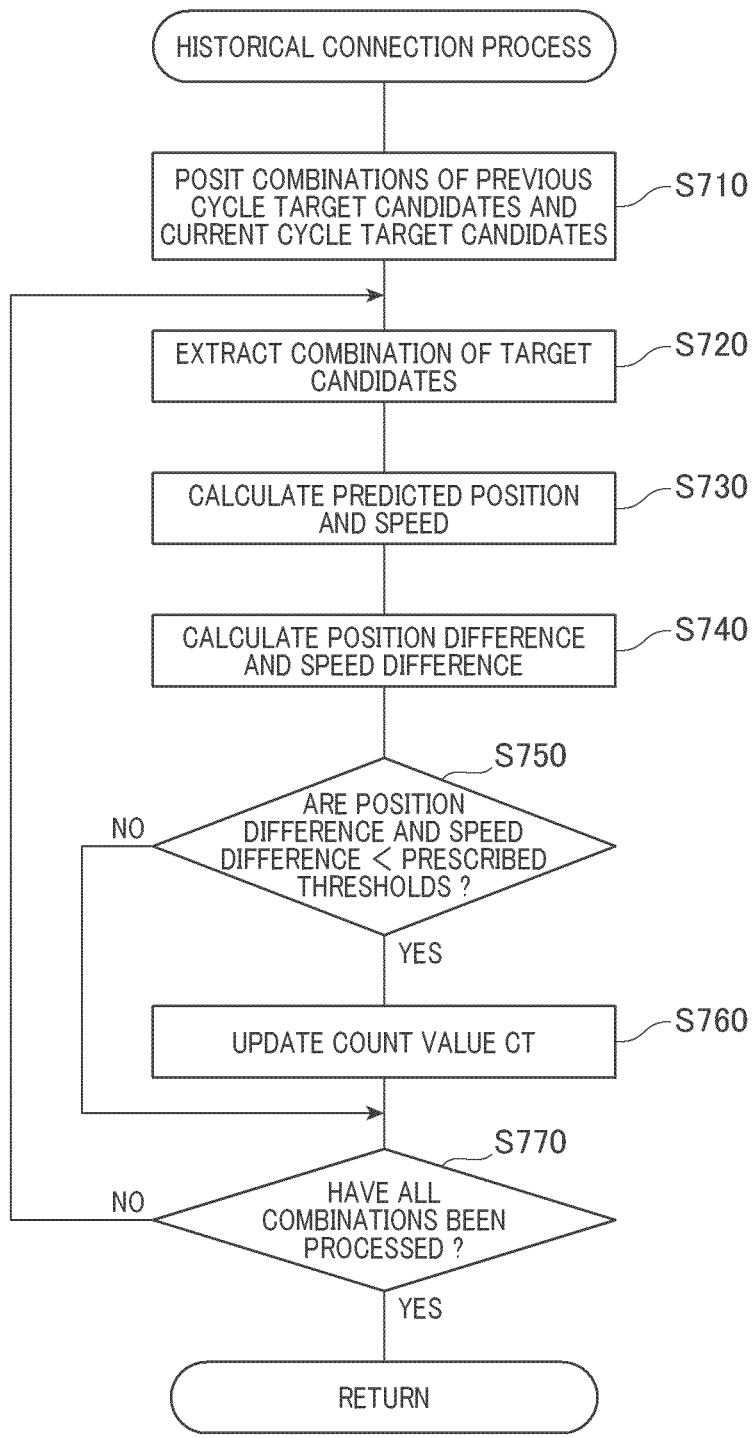
FIG. 7 is a flowchart of the processing procedure for a historical connection process.

As shown in FIG. 7, in the historical connection process performed at Step S180 of the target detection process, first, the signal processing unit 50 posits all combinations of previous cycle candidates and current cycle candidates (referred to, hereinafter, as combination pairs) (Step S710). The signal processing unit 50 then extracts any one of the combination pairs (Step S720).

The signal processing unit 50 then calculates predicted values based on the target information corresponding to the previous cycle candidate in the extracted combination pair (Step S730). The predicted values calculated at Step S730 include the position in which the current cycle candidate corresponding to the previous cycle candidate is present (referred to, hereinafter, as a predicted position) and the speed of the current cycle candidate (referred to, hereinafter, as a predicted speed). The calculation of the predicted position and the predicted speed is a known process, and therefore, a detailed description thereof is omitted herein. However, setting the results of behavior prediction of a frequency pair (in other words, the target candidate) along a time axis using a Kalman filter or the like as the predicted position and predicted speed can be considered.

Then, the signal processing unit 50 uses the predicted position and predicted speed calculated at Step S730 and the position and speed calculated from the current cycle candidate to calculate the position difference and speed difference therebetween (Step S740). In other words, the position difference refers to the difference between the position calculated from the current cycle candidate (that is, the position of the target candidate corresponding to the current cycle candidate) and the predicted position. The speed difference refers to the difference between the speed calculated from the current cycle candidate (that is, the speed of the target candidate corresponding to the current cycle candidate) and the predicted speed.

Next, when determined that the position difference is less than a reference distance prescribed in advance and the speed difference is less than an upper limit speed difference prescribed in advance (YES at Step S750), the signal processing unit 50 determines that the frequency pair configuring the combination pair correspond to the same target (in other words, has a historical connection) and updates a count value CT of a connection counter of the current cycle candidate to a value that is obtained by adding 1 to the count value of a connection counter of the previous cycle candidate (Step S760). The signal processing unit 50 then proceeds to Step S770.

Meanwhile, when determined that either of the position difference and the speed difference is greater than the reference values (NO at Step S750), the signal processing unit 50 proceeds to Step S770 without performing Step S760.

At Step S770, the signal processing unit 50 determines whether or not the processes from Step S720 to Step S760 have been performed for all combination pairs. As a result of the determination, when determined that an unprocessed combination pair is present (NO at Step S770), the signal processing unit 50 returns to Step S720 and extracts a combination pair from the unprocessed combination pairs.

Meanwhile, as a result of the determination at Step S770, when determined that no unprocessed combination pairs are present (YES at Step S770), the signal processing unit 50 ends the historical connection process and proceeds to Step S190 of the target detection process.

<Transmission Target Identification Process>

As shown in FIG. 8, in the transmission target identification process performed at Step S190 of the target determination process, first, the signal processing unit 50 extracts a single first target candidate from all first target candidates (Step S910).

Then, the signal processing unit 50 determines whether or not the flag indicating that the first target candidate is a false image is included in the first target information corresponding to the first target candidate extracted at Step S910 (Step S920). As a result of the determination at Step S920, when determined that the flag indicating false image is included (YES at Step S920), the signal processing unit 50 calculates an evaluation value Xt at the current cycle (Step S930). At Step S930, specifically, the signal processing unit 50 calculates the evaluation value $X_t$ at the current cycle by adding a prescribed value V1 (such as "−3") to an evaluation value $X_{t-1}$ at the previous cycle of the first target candidate extracted at Step S910. Then, the signal processing unit 50 proceeds to Step S990, described in detail hereafter.

Meanwhile, as a result of the determination at Step S920, when determined that the flag indicating false image is not included in the first target information corresponding to the first target candidate extracted at Step S910 (NO at Step S920), the signal processing unit 50 determines whether or not the flag indicating real image is included in the first target information corresponding to the first target candidate extracted at Step S910 (Step S940). As a result of the determination at Step S940, when determined that the flag indicating real image is included (YES at Step S940), the signal processing unit 50 calculates the evaluation value Xt at the current cycle (Step S950). At Step S950, specifically, the signal processing unit 50 calculates the evaluation value $X_t$ at the current cycle by adding a prescribed value V2 prescribed in advance as a value that is greater than the prescribed value V1 (V2>V1; such as "+2") to the evaluation value $X_{t-1}$ at the previous cycle of the first target candidate extracted at Step S910. The signal processing unit 50 then proceeds to Step S990.

As a result of the determination at Step S940, when determined that the flag indicating real image is not included in the first target information corresponding to the first target candidate extracted at Step S910 (NO at Step S940), the signal processing unit 50 determines whether or not the distance L corresponding to the first target candidate extracted at Step S910 is equal to or greater than a prescribed distance prescribed in advance (Step S960). The prescribed distance herein is prescribed as a detectable distance along the vehicle advancing direction in the wide angle area.

As a result of the determination at Step S960, when determined that the distance L corresponding to the first target candidate extracted at Step S910 is the prescribed distance or greater (YES at Step S960), the signal processing unit 50 determines that the first target candidate has a high likelihood of being a real image and calculates the evaluation value Xt at the current cycle (Step S970). At Step S970, specifically, the signal processing unit 50 calculates the evaluation value $X_t$ at the current cycle by adding a prescribed value V3 prescribed in advance to the evaluation value $X_{t-1}$ at the previous cycle of the first target candidate extracted at Step S910. The prescribed value V3 is a value prescribed in advance as a value greater than the prescribed value V1 and less than the prescribed value V2 (V2>V3>V1; such as "+1").

The signal processing unit 50 then proceeds to Step S990.

Meanwhile, as a result of the determination at Step S960, when determined that the distance L corresponding to the first target candidate extracted at Step S910 is less than the prescribed distance (NO at Step S960), the signal processing unit 50 determines that the first target candidate has a low likelihood of being a real image and calculates the evaluation value Xt at the current cycle (Step S980). At Step S980, specifically, the signal processing unit 50 calculates the evaluation value $X_{t-1}$ at the previous cycle of the first target candidate extracted at Step S910 itself as the evaluation value $X_t$ at the current cycle.

At subsequent Step S990, the signal processing unit 50 determines whether or not the evaluation value $X_t$ at the current cycle is equal to or less than a threshold $Th_{min}$ prescribed in advance as a lower limit value indicating that there is a likelihood of the target candidate being a real image. As a result of the determination at Step S990, when determined that the evaluation value $X_t$ at the current cycle is the threshold $Th_{min}$ or less (YES at Step S990), the signal processing unit 50 removes the target information corresponding to the first target candidate extracted at Step S910 from a transmission subject (Step S1000). In other words, at Step S1000 according to the present embodiment, the target information corresponding to the first target candidate extracted at Step S910 is prohibited from being outputted to the driving assistance ECU 60 and the like.

The signal processing unit 50 then proceeds to Step S1040.

Meanwhile, as a result of the determination at Step S990, when determined that the evaluation value $X_t$ at the current cycle is greater than the threshold $Th_{min}$ (NO at Step S990), the signal processing unit 50 determines whether or not the evaluation value $X_t$ at the current cycle is equal to or greater than a threshold value $Th_{max}$ prescribed in advance as a lower limit value of the evaluation value indicating that the target candidate is probable as a real image (Step S1010).

As a result of the determination at Step S1010, when determined that the evaluation value $X_t$ at the current cycle is less than the threshold $Th_{max}$ (NO at Step S1010), the signal processing unit 50 determines that the first target candidate extracted at Step S910 has a likelihood of being a false image, and attaches a temporary flag indicating that there is a likelihood of the target candidate being a false image to the target information corresponding to the first target candidate extracted at Step S910 (Step S1020). The signal processing unit 50 then proceeds to Step S1040.

As a result of the determination at Step S1010, when determined that the evaluation value $X_t$ at the current cycle is the threshold $Th_{max}$ or greater (YES at Step S1010), the signal processing unit 50 determines that the first target candidate extracted at Step S910 is a real image, and sets the target information corresponding to the first target candidate extracted at Step S910 itself as the transmission subject, without attaching the temporary flag thereto (Step S1030). The signal processing unit 50 then proceeds to Step S1040.

At Step S1040, the signal processing unit 50 determines whether or not the processes from Step S910 to Step S1030 have been performed for all first target candidates. As a result of the determination, when determined that an unprocessed first target candidate is present (NO at Step S1040), the signal processing unit 50 returns to Step S910 and extracts a single first target candidate from the unprocessed first target candidates.

Meanwhile, as a result of the determination at Step S1040, when determined that no unprocessed first target candidates are present (YES at Step S1040), the signal processing unit 50 ends the transmission target identification process and proceeds to Step S200 of the target detection process.

At Step S200, the signal processing unit 50 outputs, to the driving assistance ECU 60, the first target information that is in a state in which the temporary flag is attached thereto regarding the first target information to which the temporary flag is attached, and the first target information itself in a state in which the temporary flag is not attached thereto regarding the first target information to which the temporary flag is not attached.

Effects According to the Embodiment

As described above, in the radar sensor 10, whether or not the subject target candidate is a real image or a false image can be determined by comparing the first target information corresponding to the subject target candidate with the second target information corresponding to the comparison target candidate.

The first target information and the second target information used in the determination include the power (signal level) of the signals received by the antenna elements Ar configuring the reception antenna, in addition to the first orientation $\theta_L$ detected based on the phase difference between the first reception signals and the orientation $\theta_W$ detected based on the phase difference between the second reception signals, respectively.

Therefore, in the radar sensor 10, the accuracy of determination regarding whether the first target candidate is a real image or a false image can be improved.

In particular, in the radar sensor 10, the condition for determining that the subject target candidate is a real image is that the difference G between the power at the frequency peak corresponding to the subject target candidate and the power at the frequency peak corresponding to the comparison target candidate is the prescribed threshold $Th_G$ or less.

This condition is unambiguously determined as a result of the difference in directivity of the reception antenna depending on the arrangement interval of the antenna elements Ar. Therefore, in the radar sensor 10, the determination that the subject target candidate is a real image can be made with certainty.

Furthermore, in the radar sensor 10, in addition to the above-described condition, the condition for determining that the subject target candidate is a real image is that the first orientation $\theta_L$ corresponding to the subject target candidate matches the second orientation $\theta_W$ corresponding to the comparison target candidate.

Therefore, in the radar sensor 10, the probability of the subject target candidate being a real image can be improved in the determination result.

In addition, in the radar sensor 10, the condition for determining that the subject target candidate is a false image is that the difference $\Delta\theta$ between the first orientation $\theta_L$ corresponding to the subject target candidate and the second orientation $\theta_W$ corresponding to the comparison target candidate is within the prescribed angle range $Th\theta$.

This condition is unambiguously determined as a result of the difference in directivity of the reception antenna depending on the arrangement interval of the antenna elements Ar.

Therefore, in the radar sensor 10, that the subject target candidate is a false image can be determined with certainty.

Furthermore, at Step S200 in the target detection process according to the present embodiment, regarding a first target candidate that has a high likelihood of being a false image, the first target information corresponding to the first target candidate is not outputted to the driving assistance ECU 60.

Therefore, the accuracy of recognition of a leading vehicle as a control subject in adaptive cruise control and an obstacle as a control subject in pre-crash safety control performed by the driving assistance ECU 60 can be improved. Situations in which the driving assistance ECU 60 performs erroneous control can be reduced.

In addition, at Step S200 in the target detection process according to the present embodiment, regarding the first target information to which the temporary flag is attached, the first target information that is in a state in which the temporary flag is attached thereto is outputted to the driving assistance ECU 60.

Therefore, for example, recognition of a leading vehicle as a control subject in adaptive cruise control and an obstacle as a control subject in pre-crash safety control performed by the driving assistance ECU 60 can be held on standby until confirmation is made that the first target candidate is definitely a real image. As a result, situations in which the driving assistance ECU 60 performs control based on erroneously recognized leading vehicles and obstacles can be reduced, and situations in which erroneous control is performed can be reduced.

Other Embodiments

An embodiment of the present invention is described above. However, the present invention is not limited to the above-described embodiment, and various embodiments are possible without departing from the spirit of the present invention.

For example, according to the above-described embodiment, the evaluation value X is updated in the transmission target identification process. However, the process in which the evaluation value X is updated is not limited to the transmission target identification process, and the evaluation value X may be updated in the historical connection process. In other words, according to the above-described embodiment, the evaluation value X is an indicator that is separate from the count value CT of the connection counter. However, the count value CT of the connection counter may be added to the evaluation value X.

In addition, in the historical connection process according to the above-described embodiment, the subject for determination regarding whether or not a historical connection is possible is the first target candidate. However, the subject for determination regarding whether or not a historical connection is possible in the historical connection process is not limited thereto. In addition to the first target candidate, the second target candidate can be included in the subject for determination regarding whether or not a historical connection is possible. Specifically, at Step S710 in the historical connection process, when the combination pairs are posited, combinations of the first target candidates detected at the previous cycle and the second target candidates detected at the current cycle may be posited, in addition to the combinations of the first target candidates detected at the previous cycle and the first target candidates detected at the current cycle being posited.

In other words, in the historical connection process, when a historical connection is present between a second target candidate detected at the current cycle and a first target candidate detected during a confirmation period up to the current point that is set in advance, the evaluation value may be increased. In this case, when values compatible with the predicted values are present in the second target information corresponding to the second target candidate, the second target candidate can be determined to be that having a historical connection to the first target candidate corresponding to the predicted values.

As a result, a target candidate that is detected as a second target candidate in the wide angle detection process without being detected in the narrow angle detection process, regardless of the target candidate being a first target candidate detected before the previous cycle and the same target as the first target candidate can be historically connected, and that the target candidate is probable as a target can be continuously recognized.

The interpretation of the present invention is not limited in any way by the above-described embodiment. In addition, an embodiment in which a part of the configuration according to the above-described embodiment is omitted to an extent enabling the problem to be solved is also an embodiment of the present invention. In addition, an embodiment that is configured by the above-described embodiment and variation examples being combined as appropriate is also an embodiment of the present invention. Furthermore, any embodiment conceivable without departing from the essence of the present invention specified by the recitations in the scope of claims is also an embodiment of the present invention. Moreover, although reference numbers used in the description of the above-described embodiment are used as appropriate in the scope of claims, the reference numbers are used for the purpose of facilitating understanding of the invention according to each claim and are not intended to limit the technical scope of the invention according to each claim.

REFERENCE SIGNS LIST 1 driving assistance system
10 radar sensor
32 oscillator
33 amplifier
34 distributor
36 transmission antenna
40 reception antenna unit
41 array antenna
42 reception switch
43 mixer
44 amplifier
45 filter
46 A/D converter
50 signal processing unit
60 driving assistance ECU

What is claimed is:
1. A radar apparatus comprising:
transmitting means for transmitting exploration waves;
a first receiving means for acquiring, as first reception signals, signals corresponding to signal waveforms respectively received by a plurality of first antenna elements disposed at a first interval prescribed in advance;
a first calculating means for:
detecting, based on the first reception signals, respective first target candidates for at least one target that has reflected at least one of the exploration waves, and calculating first target information, for each first target candidate, including at least a signal level of the first reception signal corresponding to the first target candidate, a first distance that is the distance to the first target candidate, and a first orientation that is the orientation in which the first target candidate is present and is detected by an electronic scanning method;

a second receiving means for acquiring, as second reception signals, signals corresponding to signal waveforms received by a plurality of second antenna elements disposed at a second interval that is narrower than the first interval;

a second calculating means for:

detecting, based on the second reception signals, respective second target candidates for at least one target that has reflected at least one of the exploration waves, and calculating second target information, for each second target candidate, including at least a signal level of the second reception signal corresponding to the second target candidate, a second distance that is the distance to the second target candidate, and a second orientation that is the orientation in which the second target candidate is present and is detected by an electronic scanning method;

a comparing means for:

setting, as at least one subject target candidate, at least one first target candidate among the first target candidates detected by the first calculating means, the at least one subject target candidate having at least the first distance that matches the second distance included in the second target information calculated by the second calculating means, and comparing the first target information of the at least one subject target candidate with the second target information including one of the second distances that matches the first distance of the at least one subject target candidate, at least one of the second distances that matches the first distance of the at least one subject target candidate being referred to as a matched second distance; and a determining means for determining whether the at least one subject target candidate is a real image or a false image based on the result of comparison by the comparing means, wherein:

the determining means is configured to:

determine whether one of a first condition and a second condition is satisfied, the first condition being that:

a difference between the signal level of the first reception signal of the at least one subject target candidate and the signal level of the second reception signal corresponding to the matched second distance is outside a prescribed range, and a difference between the first orientation included in the first target information of the at least one subject target candidate and the second orientation included in the second target information including the matched second distance is outside a prescribed angle range determined in advance, the second condition being that:

the difference between the signal level of the first reception signal of the at least one subject target candidate and the signal level of the second reception signal corresponding to the matched second distance is within the prescribed range, and the first orientation included in the first target information does not match the second orientation included in the second target information including the matched second distance; and determine that a result of determination of whether the at least one subject target candidate is a real image or a false image is suspended as an uncertain determination when determining that one of the first and second conditions is satisfied.

2. The radar apparatus according to claim 1, wherein:

the determining means is a means for determining that the at least one subject target candidate is a real image when a difference between the signal level of the first reception signal of the at least one subject target candidate and the signal level of the second reception signal corresponding to the matched second distance is within a prescribed range prescribed in advance.

3. The radar apparatus according to claim 2, wherein:

the determining means is a means for determining that the at least one subject target candidate is a real image when the first orientation included in the first target information matches the second orientation included in the second target information including the matched second distance.

4. The radar apparatus according to claim 2, wherein:

the determining means is a means for determining that the at least one subject target candidate is a false image when:

the difference between the signal level of the first reception signal of the at least one subject target candidate and the signal level of the second reception signal corresponding to the matched second distance is outside the prescribed range, and the difference between the first orientation included in the first target information of the at least one subject target candidate and the second orientation included in the second target information including the matched second distance is within a prescribed angle range determined in advance.

5. The radar apparatus according to claim 2, wherein:

the transmitting means is a means for transmitting continuous waves that are frequency modulated along a time axis as the exploration waves;

the first calculating means is a means for calculating, for each first target candidate, the first target information including a first relative speed that is a relative speed in relation to the first target candidate;

the second calculating means is a means for calculating, for each second target candidate, the second target information including a second relative speed that is a relative speed in relation to the second target candidate; and the comparing means is a means for setting, as the at least one subject target candidate, at least one first target candidate having the first relative speed that matches the second relative speed included in the second target information.

6. The radar apparatus according to claim 2, comprising:

an evaluation value calculating means for calculating an evaluation value that increases as the likelihood of the at least one subject target candidate being a real image increases, based on the determination results from the determining means; and an output means for outputting outside the radar apparatus, information indicating that the at least one subject target candidate is a real image, with the at least one subject target candidate as a confirmed target that is confirmed to be a target, when the evaluation value calculated by the evaluation value calculating means is equal to or greater than a prescribed threshold prescribed in advance, and information related to the confirmed target.

7. The radar apparatus according to claim 6, wherein:
the transmitting means is a means for repeatedly transmitting the exploration waves at a in prescribed measurement cycles;
the first calculating means is a means for detecting, based on the first reception signals, the respective first target candidates for at least one target that has reflected at least one of the exploration waves, each time the transmitting means transmits the exploration waves;
the second calculating means is a means for detecting, based on the second reception signals, respective second target candidates for at least one target that has reflected at least one of the exploration waves, each time the transmitting means transmits the exploration waves, and
the evaluation value calculating means is a means for increasing the evaluation value of the at least one subject target candidate when the at least one subject target candidate is determined to be a rear image over each of plural cycles in the measurement cycles.

8. The radar apparatus according to claim 6, wherein:
the evaluation value calculating means is a means for reducing the evaluation value of the at least one subject target candidate when, as a result of the determination by the determining means, the subject target candidate is a false image.

9. The radar apparatus according to claim 6, wherein:
the evaluation value calculating means includes a means for retaining the evaluation value calculated at a previous measurement cycle when the determining means determining that a result of determination of whether the at least one subject target candidate is a real image or a false image is suspended as an uncertain determination.

10. The radar apparatus according to claim 6, wherein:
the output means includes a means for prohibiting, to an external apparatus, output of information related to the at least one subject target candidate that corresponds to the evaluation value when the evaluation value is less than the prescribed threshold.

11. The radar apparatus according to claim 6, wherein:
the transmitting means is a means for repeatedly transmitting the exploration waves in prescribed measurement cycles;
the evaluation value calculating means includes:
a predicting means for:
estimating at least one pair of one of the first target candidates calculated in a previous measurement cycle and one of the first target candidates calculated in a present measurement cycle; and
determining a predicted positional parameter value of the first target information of one of the first target candidates calculated in the previous measurement cycle, and
an updating means for:
calculating a difference between the predicted positional parameter value of the first target information of one of the first target candidates calculated in the previous measurement cycle and a corresponding predicted positional parameter value of the first target information of each of the first target candidates calculated in the present measurement cycle; and
increasing the evaluation value of one of the first target candidates calculated in the present measurement cycle when the calculated difference is lower than a predetermined reference parameter value.

12. The radar apparatus according to claim 1, wherein:
the determining means is a means for determining that the at least one subject target candidate is a false image when the difference between the signal level of the first reception signal of the at least one subject target candidate and the signal level of the second reception signal corresponding to the matched second distance is outside the prescribed range, and a difference between the first orientation included in the first target information of the at least one subject target candidate and the second orientation included in the second target information including the matched second distance is within a prescribed angle range determined in advance.

13. The radar apparatus according to claim 1, wherein:
the transmitting means is a means for transmitting continuous waves that are frequency modulated along a time axis as the exploration waves;
the first calculating means is a means for calculating, for each first target candidate, the first target information including a first relative speed that is a relative speed in relation to the first target candidate;
the second calculating means is a means for calculating, for each second target candidate, the second target information including a second relative speed that is a relative speed in relation to the second target candidate; and
the comparing means is a means for setting, as the at least one subject target candidate, at least one first target candidate having the first relative speed that matches the second relative speed included in the second target information.

14. The radar apparatus according to claim 1, comprising:
evaluation value calculating means for calculating an evaluation value that increases as the likelihood of the at least one subject target candidate being a real image increases, based on the determination results from the determining means; and
output means for outputting outside the radar apparatus, information indicating that the at least one subject target candidate is a real image, with the at least one subject target candidate as a confirmed target that is confirmed to be a target, when the evaluation value calculated by the evaluation value calculating means is equal to or greater than a prescribed threshold prescribed in advance, and information related to the confirmed target.

15. The radar apparatus according to claim 14, wherein:
the transmitting means is a means for repeatedly transmitting the exploration waves at a in prescribed measurement cycles;
the first calculating means is a means for detecting, based on the first reception signals, the respective first target candidates for at least one target that has reflected at least one of the exploration waves, each time the transmitting means transmits the exploration waves;
the second calculating means is a means for detecting, based on the second reception signals, respective second target candidates for at least one target that has reflected at least one of the exploration waves, each time the transmitting means transmits the exploration waves; and the evaluation value calculating means is a means for increasing the evaluation value of the at least one subject target candidate when the at least one subject target candidate is determined to be a rear image over each of plural cycles in the measurement cycles.

16. The radar apparatus according to claim 15, wherein:

the evaluation value calculating means is a means for reducing the evaluation value of the at least one subject target candidate when, as a result of the determination by the determining means, the subject target candidate is a false image.

17. The radar apparatus according to claim 1, wherein:

the transmitting means is a means for repeatedly transmitting the exploration waves in prescribed measurement cycles;

the evaluation value calculating means includes:
a predicting means for:
estimating at least one pair of one of the first target candidates calculated in a previous measurement cycle and one of the first target candidates calculated in a present measurement cycle; and determining a predicted positional parameter value of the first target information of one of the first target candidates calculated in the previous measurement cycle, and an updating means for:
calculating a difference between the predicted positional parameter value of the first target information of one of the first target candidates calculated in the previous measurement cycle and a corresponding predicted positional parameter value of the first target information of each of the first target candidates calculated in the present measurement cycle; and increasing the evaluation value of one of the first target candidates calculated in the present measurement cycle when the calculated difference is lower than a predetermined reference parameter value.

* * * * *